(12) United States Patent
Bixby

(10) Patent No.: US 12,269,527 B1
(45) Date of Patent: Apr. 8, 2025

(54) DEVICE FOR MOTORIZING A MANUAL GOLF PUSH CART

(71) Applicant: Sergio Bixby, Austin, TX (US)

(72) Inventor: Sergio Bixby, Austin, TX (US)

(73) Assignee: Sergio Bixby, Austin, TX (US)

( * ) Notice: Subject to any disclaimer, the term of this patent is extended or adjusted under 35 U.S.C. 154(b) by 0 days.

(21) Appl. No.: 18/824,693

(22) Filed: Sep. 4, 2024

(51) Int. Cl.
*B62B 5/00* (2006.01)

(52) U.S. Cl.
CPC ........ *B62B 5/005* (2013.01); *B62B 2202/404* (2013.01)

(58) Field of Classification Search
CPC ..................................................... B62B 5/005
See application file for complete search history.

(56) References Cited

U.S. PATENT DOCUMENTS

| | | | | |
|---|---|---|---|---|
| 3,330,371 A * | 7/1967 | Seaman | ................ | B62B 5/0026 180/65.6 |
| 3,941,198 A * | 3/1976 | Kappas | ................ | B62B 5/0026 388/828 |
| 4,019,597 A * | 4/1977 | Carmichael | ........... | B62B 5/0026 180/11 |
| 5,232,065 A * | 8/1993 | Cotton | ................ | B62B 5/0026 280/DIG. 6 |
| 5,307,889 A * | 5/1994 | Bohannan | ............ | B62D 61/065 280/DIG. 5 |
| 5,651,422 A * | 7/1997 | Casali | ................ | B62B 5/0026 180/907 |
| 5,839,528 A * | 11/1998 | Lee | ................ | B62D 51/04 280/DIG. 6 |
| 5,899,284 A * | 5/1999 | Reimers | ................ | B62B 5/0026 280/DIG. 6 |
| 6,276,470 B1 * | 8/2001 | Andreae, Jr. | ........... | B62D 51/04 280/DIG. 5 |
| 6,662,887 B2 * | 12/2003 | Agutter | ................ | B62D 51/04 180/19.1 |
| 8,297,384 B2 * | 10/2012 | Wanger | ................ | B62K 27/003 180/11 |
| 9,144,525 B2 * | 9/2015 | Richter | ................ | A61G 5/1005 |
| 12,024,215 B2 * | 7/2024 | Ogawa-Garcia | ........ | B62B 5/004 |
| 2001/0022244 A1 * | 9/2001 | Takada | ................ | A61G 5/047 180/69.6 |
| 2022/0266105 A1 * | 8/2022 | Roszhart | ................ | G06V 40/20 |
| 2023/0146019 A1 * | 5/2023 | Menig | ................ | A61G 5/1051 180/11 |

FOREIGN PATENT DOCUMENTS

GB          2223994 A  *  4/1990  ............ A61G 5/045

\* cited by examiner

*Primary Examiner* — Kevin Hurley

(57) ABSTRACT

A device for motorizing a manual golf push cart comprises a housing containing a power unit and a control circuit. The power unit is operably connected to a motive element, such as a drive wheel, which engages the ground to propel the cart. An adjustable attachment mechanism connects the housing to the cart's frame, allowing the device to be easily attached and detached without modifications to the cart. A control interface communicates with the control circuit to regulate the power unit's operation, with power supplied by a source housed within the housing. The device provides a versatile solution for converting various manual golf push carts into motorized carts, offering enhanced user convenience and reducing physical effort during use.

18 Claims, 5 Drawing Sheets

DEVICE FOR MOTORIZING A MANUAL GOLF PUSH CART

FIELD OF INVENTION

The present invention relates to the field of golf equipment, specifically to devices designed to convert manual golf push carts into motorized, power-assisted carts. It involves systems and methods for enhancing the mobility and ease of use of traditional golf carts through motorization.

BACKGROUND

In recent years, the golfing industry has seen a significant evolution in terms of equipment and accessories designed to enhance the overall experience for players. One area that has garnered considerable attention is the development of power-assisted golf carts, which offer golfers the convenience of transporting their equipment with minimal physical effort. Traditionally, golfers have relied on manually operated push carts to move their bags around the course. These push carts, while effective, require the user to exert physical effort, which can lead to fatigue, particularly over long rounds or on courses with challenging terrains. The introduction of fully motorized golf trolleys provided a solution to this problem, allowing golfers to move their equipment with ease. However, these motorized solutions come with their own set of limitations and drawbacks that have prevented them from being universally adopted by golfers.

One of the primary limitations of existing motorized golf carts is their cost. The integration of electrical components, such as motors, batteries, and control systems, into these trolleys significantly increases their manufacturing and retail costs. As a result, many golfers, especially those who already own manual push carts, find it economically unfeasible to invest in a completely new motorized trolley. The high cost has created a gap in the market, where the demand for more affordable power-assisted solutions remains unmet. This cost barrier has driven a need for alternatives that can offer similar conveniences without necessitating the purchase of a new, expensive motorized trolley.

In addition to the high cost, another significant drawback of existing motorized golf carts is their lack of versatility and adaptability. Most motorized trolleys are designed as stand-alone products, meaning that they do not offer compatibility with existing push carts. Golfers who have already invested in a high-quality push cart are often forced to abandon their existing equipment if they wish to upgrade to a motorized option. This lack of adaptability not only results in additional expenses but also contributes to unnecessary waste as functional push carts are rendered obsolete. The market has thus recognized the need for a solution that allows golfers to upgrade their current push carts to motorized versions without requiring the purchase of a completely new system.

Portability and ease of use are also critical factors that have influenced the acceptance of motorized golf carts. Traditional motorized trolleys, while convenient during use, can be cumbersome to transport and store due to their size and weight. Golfers who frequently travel or those with limited storage space may find it inconvenient to carry around or store these bulky devices. This has created a demand for a solution that not only provides the benefits of power assistance but also retains the portability and compactness of a standard push cart. A system that can be easily attached and detached, and one that does not significantly increase the size or weight of the push cart, would be highly advantageous to golfers who value convenience and ease of transport.

Furthermore, the technology embedded in many existing motorized golf carts often lacks user-friendly features and fails to integrate with modern technological advancements. For instance, while some motorized carts offer basic remote control capabilities, they typically do not leverage the full potential of smart technologies, such as wireless communication or integration with smartphones. This has resulted in a growing interest in developing systems that incorporate these modern features, providing users with more control and flexibility over their equipment. The need for a user-friendly, technologically advanced system that enhances the golfing experience without adding complexity is evident in the market.

Another important factor to consider is the environmental impact of motorized golf carts. With the growing emphasis on sustainability, the golf industry is increasingly focusing on reducing its carbon footprint. Many traditional motorized trolleys are powered by lead-acid batteries, which are not only heavy but also have a significant environmental impact due to their disposal challenges. Additionally, the energy consumption of these devices can be relatively high, contributing to the overall environmental burden. This has spurred interest in developing more eco-friendly solutions, such as those utilizing rechargeable, lightweight batteries that offer longer life cycles and reduced environmental impact.

Finally, the installation and usability of existing motorized golf carts present another set of challenges. Many of these devices require complex assembly or permanent modifications to the push cart, which can deter users who prefer a simple, hassle-free solution. Golfers often seek systems that are easy to install, remove, and operate, without the need for professional assistance or extensive modifications to their existing equipment. This demand has led to the exploration of systems that can be quickly and securely attached to a wide range of push carts, offering a seamless transition between manual and power-assisted operation.

It is within this context that the present invention is provided.

SUMMARY

The present invention relates to a device for motorizing a manual golf push cart. The device comprises a housing that contains a power unit and a control circuit. The power unit is operably connected to a motive element, such as a drive wheel, which engages the ground to propel the golf cart. An adjustable attachment mechanism is provided to connect the housing to the frame of a manual golf push cart. The device further includes a control interface that communicates with the control circuit to regulate the operation of the power unit. A power source, housed within the housing, supplies electrical power to the power unit and control circuit. The device is designed to be easily attached to and detached from a manual golf push cart without requiring modifications to the cart's frame.

The invention offers a convenient solution for converting a manual golf push cart into a motorized cart, enhancing the user experience by reducing physical effort. The device's adjustable attachment mechanism allows it to be used with various cart designs, making it versatile and adaptable. The control interface provides users with the ability to operate the device remotely, offering flexibility and ease of use.

In some embodiments, the adjustable attachment mechanism comprises a telescopic assembly that can be adjusted in length to accommodate varying widths of the golf push cart frame. This feature ensures compatibility with a wide range of cart designs, allowing the device to be centrally aligned for balanced propulsion.

In further embodiments, the telescopic assembly includes a locking mechanism, such as a flip lock system, a twist-lock system, or detent pins, which secures the telescopic tube at a desired length. This prevents the assembly from shifting during use, ensuring a stable connection to the cart.

In yet further embodiments, the adjustable attachment mechanism includes clamps, which may for example be of a C type with quick adjustable locking knobs, or may use a cam lever and be equipped with a quick-release lever system. This feature allows for rapid attachment and detachment of the device, enhancing its convenience for users who frequently transport or store their golf cart.

In additional embodiments, the clamps are lined with a rubberized or silicone material to protect the frame of the golf push cart and prevent slippage. This provides a secure grip, maintaining the device's position even on uneven terrain.

In some embodiments, the motive element comprises a drive wheel made from a durable rubber compound with a high-traction tread pattern. This design enhances the wheel's ability to navigate various terrains, including grass, gravel, and dirt, ensuring consistent performance across different golf courses.

In further embodiments, the power unit comprises an electric motor, such as ageared brushless DC motor, which offers high efficiency and reliability. The motor is designed to operate at a voltage suitable for providing sufficient power to propel a fully loaded golf cart over varying terrains.

In yet further embodiments, the power source comprises a rechargeable lithium-ion battery, which provides a balance between energy density and weight. The battery is connected to a battery management system (BMS) to monitor charge levels and protect against overcharging, extending the battery's lifespan.

In additional embodiments, the housing includes an interface for charging the rechargeable battery, which is accessible from the exterior. This feature allows users to conveniently recharge the device without needing to remove the battery from the housing.

In some embodiments, the control interface comprises a remote control device that operates using radio frequency (RF) communication. This allows the user to control the device from a distance, providing flexibility in operation.

In further embodiments, the control interface includes a smartphone application that communicates with the control circuit via Bluetooth. The application may offer additional functionalities, such as speed control, GPS tracking, and battery monitoring, enhancing the user's control over the device.

In yet further embodiments, the housing includes a suspension system that absorbs shocks and helps maintain contact between the drive wheel and the ground. This improves the device's performance on uneven terrain, reducing the likelihood of the wheel losing traction.

In additional embodiments, the device includes an emergency stop mechanism that immediately halts the operation of the power unit upon activation. This feature adds a layer of safety, allowing users to quickly stop the cart in case of an emergency.

In some embodiments, the control circuit is configured to automatically stop the power unit if communication with the control interface is lost. This fail-safe mechanism ensures that the cart does not continue to operate uncontrollably if the remote signal is interrupted.

In further embodiments, the housing is constructed from materials that are water-resistant and corrosion-resistant, providing protection against environmental factors such as rain and humidity. This ensures the device's durability and reliability in outdoor conditions.

In yet further embodiments, the adjustable attachment mechanism is designed to connect to the frame of the manual golf push cart without requiring permanent modifications. This feature allows the user to maintain the original structure and functionality of their cart, providing a reversible upgrade to motorized operation.

BRIEF DESCRIPTION OF THE DRAWINGS

Various embodiments of the invention are disclosed in the following detailed description and accompanying drawings.

Figure 1:
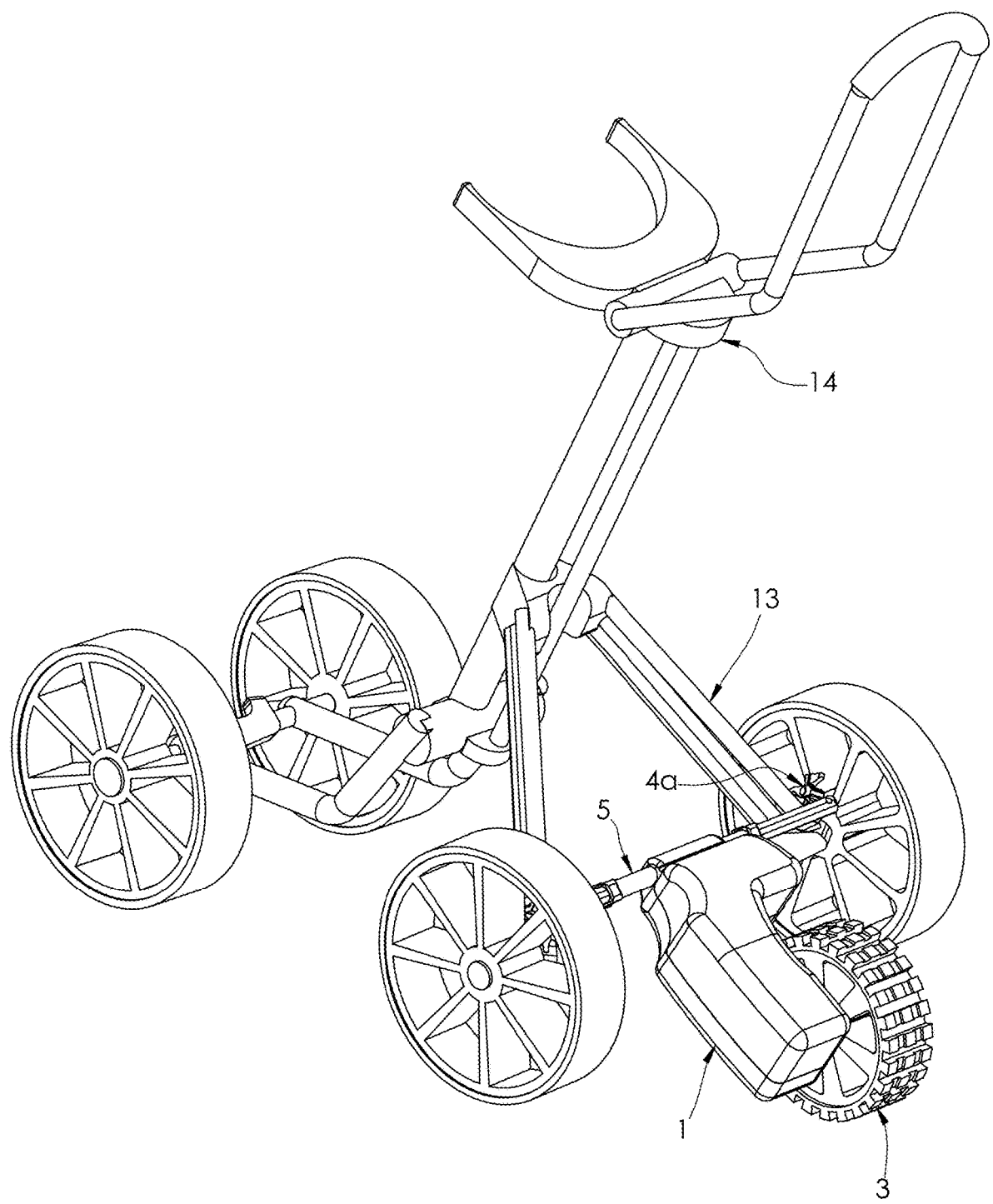
FIG. 1 illustrates an example perspective view of the device attached to the rear axle of a golf push cart.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The term "housing" refers to any structure or enclosure that contains and protects the internal components of the device. This includes, but is not limited to, casings made from plastic, metal, or composite materials. In one example implementation, the housing may be constructed from injection-molded polycarbonate, providing durability and resistance to environmental factors such as moisture and impact. The housing may include apertures for ventilation and interfaces for power input and control connections.

The term "power unit" refers to any component or system within the device that generates mechanical force to drive the motive element. This includes, but is not limited to, electric motors of various types, such as brushed DC motors, brushless DC motors, or stepper motors. In one example implementation, the power unit may be a geared brushless DC motor rated at 24 volts, providing efficient and reliable operation over extended periods. The motor may be directly connected to the drive wheel via a keyed shaft and coupler to ensure secure power transmission.

The term "motive element" refers to any component that engages with the ground to propel the golf push cart. This includes, but is not limited to, wheels, tracks, or other ground-contact mechanisms. In one example implementation, the motive element may be a rubberized wheel with a diameter of 8 inches and a high-traction tread pattern, suitable for traversing various terrains typically found on golf courses. The wheel may be connected to the power unit through a direct drive system to minimize mechanical losses and ensure responsive operation.

The term "adjustable attachment mechanism" refers to any system or assembly that allows the device to be secured to the frame of a manual golf push cart and adjusted to fit various cart designs. This includes, but is not limited to, telescopic tubes, clamps, and locking mechanisms. In one example implementation, the adjustable attachment mechanism may consist of telescopic aluminum tubes with a flip-lock system, allowing the user to extend and lock the tubes at the desired length. The ends of the tubes may feature quick-release clamps with rubberized linings, designed to grip the cart's frame securely without damaging it.

The term "control interface" refers to any component or system that allows a user to interact with the control circuit to operate the power unit. This includes, but is not limited to, remote control devices, smartphone applications, or onboard control panels. In one example implementation, the control interface may be a handheld remote control device using RF communication at 433 MHZ, providing a range of up to 50 meters. The remote may feature buttons for starting, stopping, and adjusting the speed of the power unit, with feedback provided through LED indicators.

The term "power source" refers to any component or system that provides electrical energy to the power unit and control circuit. This includes, but is not limited to, batteries, capacitors, or power adapters. In one example implementation, the power source may be a lithium-ion battery pack with a capacity of 10 ampere-hours (Ah) at 24 volts, providing sufficient energy for several hours of operation. The battery may include a battery management system (BMS) to monitor charge levels, balance the cells, and protect against overcharging.

The term "control circuit" refers to any electronic system or component that manages the operation of the power unit in response to signals from the control interface. This includes, but is not limited to, microcontrollers, relays, signal processors, and power regulators. In one example implementation, the control circuit may consist of a microcontroller that processes inputs from the remote control and adjusts the power output to the motor using pulse-width modulation (PWM). The circuit may also include safety features such as an automatic stop if communication with the control interface is lost.

The dimensions and specifications provided herein, such as the length and diameter of the telescopic tubes, motor power, and battery capacity, are intended to represent example values that may vary depending on further testing and specific design requirements. For instance, the tube length may range from approximately 20 cm to 50 cm, and the tube diameter may range from approximately 18 cm to 25 cm. Similarly, the motor power may vary between 80 to 150 watts, and the battery capacity may range from 5 Ah to 10 Ah. These values are illustrative and may be adjusted as the development of the device progresses, to optimize performance and compatibility with different golf push cart configurations.

DESCRIPTION OF DRAWINGS

The present invention relates to a device designed to motorize manual golf push carts, providing a convenient and cost-effective solution for golfers who seek to reduce physical effort while transporting their equipment across a golf course. The device is particularly advantageous for golfers who already own a manual push cart, as it can be easily attached to and detached from the cart without requiring any modifications to the cart's existing structure. This innovation addresses several of the shortcomings identified in the prior art, offering a versatile and adaptable alternative to traditional motorized golf carts and trolleys.

One of the primary benefits of this invention is its ability to retrofit existing manual golf push carts, thereby avoiding the need for golfers to purchase entirely new motorized carts. The device features an adjustable attachment mechanism that allows it to be securely connected to a wide range of push carts, ensuring that it can be used with most models available on the market. This adjustability not only enhances the device's versatility but also extends its usability across different cart designs, making it an appealing option for a broader segment of golfers, and more widely compatible than existing solutions.

The invention also provides significant advantages in terms of portability and ease of use. Unlike traditional motorized golf carts, which can be bulky and difficult to transport, the device is compact and lightweight, making it easy for golfers to carry it along with their existing equipment. The quick-release clamps and telescopic assembly further simplify the installation and removal process, enabling users to set up or stow the device in a matter of minutes without the need for tools or technical expertise.

Another key benefit of the invention is the incorporation of a remote control interface, which allows users to operate the motorized cart from a distance. This feature provides added convenience, as golfers can control the movement of their cart without having to remain in close proximity. The control interface is designed to be intuitive and user-friendly, ensuring that even those with minimal technical experience can effectively manage the cart's operation.

Figure 2:
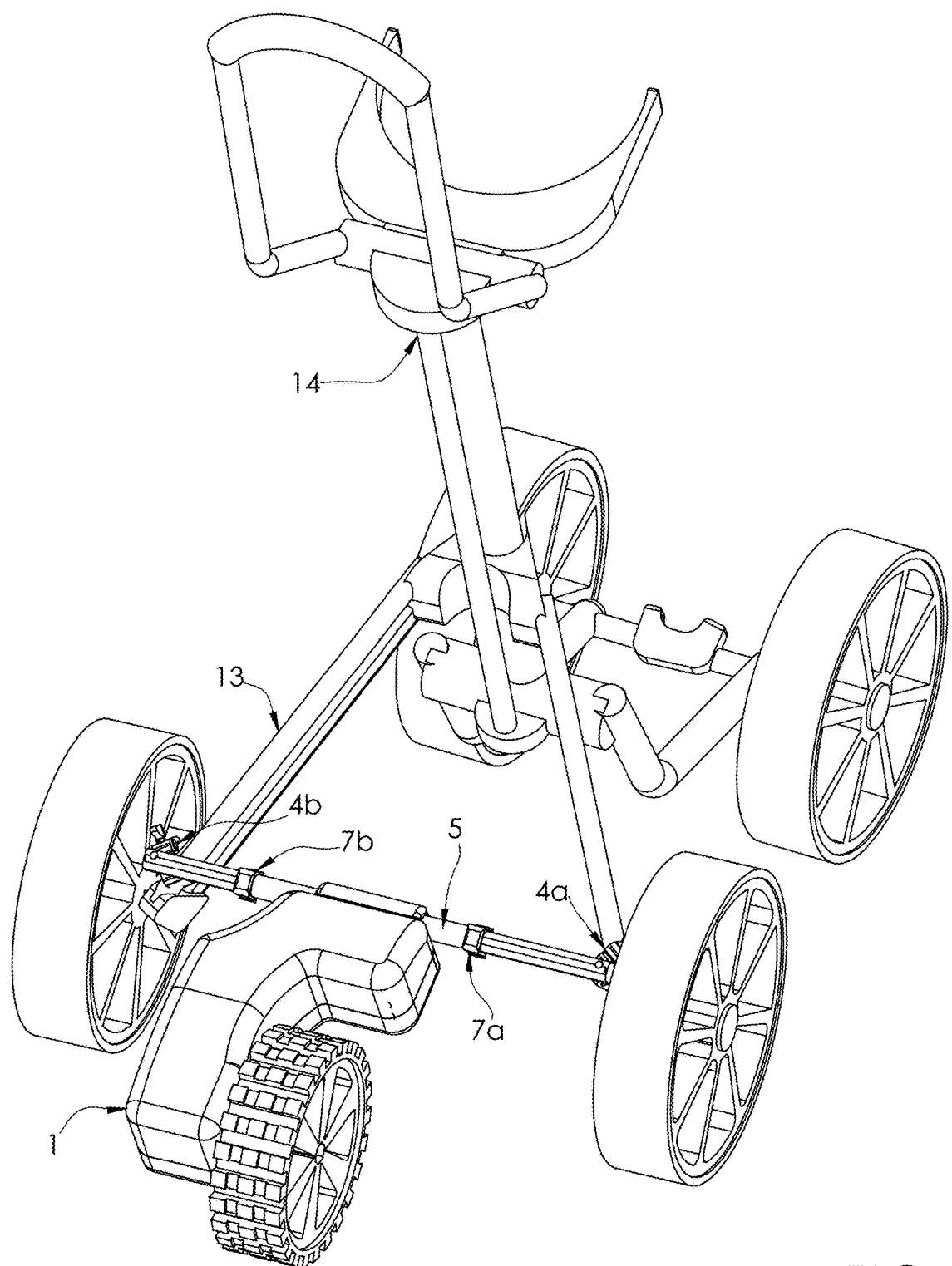
FIG. 2 illustrates another example perspective view of the device attached to the rear axle of a golf push cart from a different angle.
Figure 3:
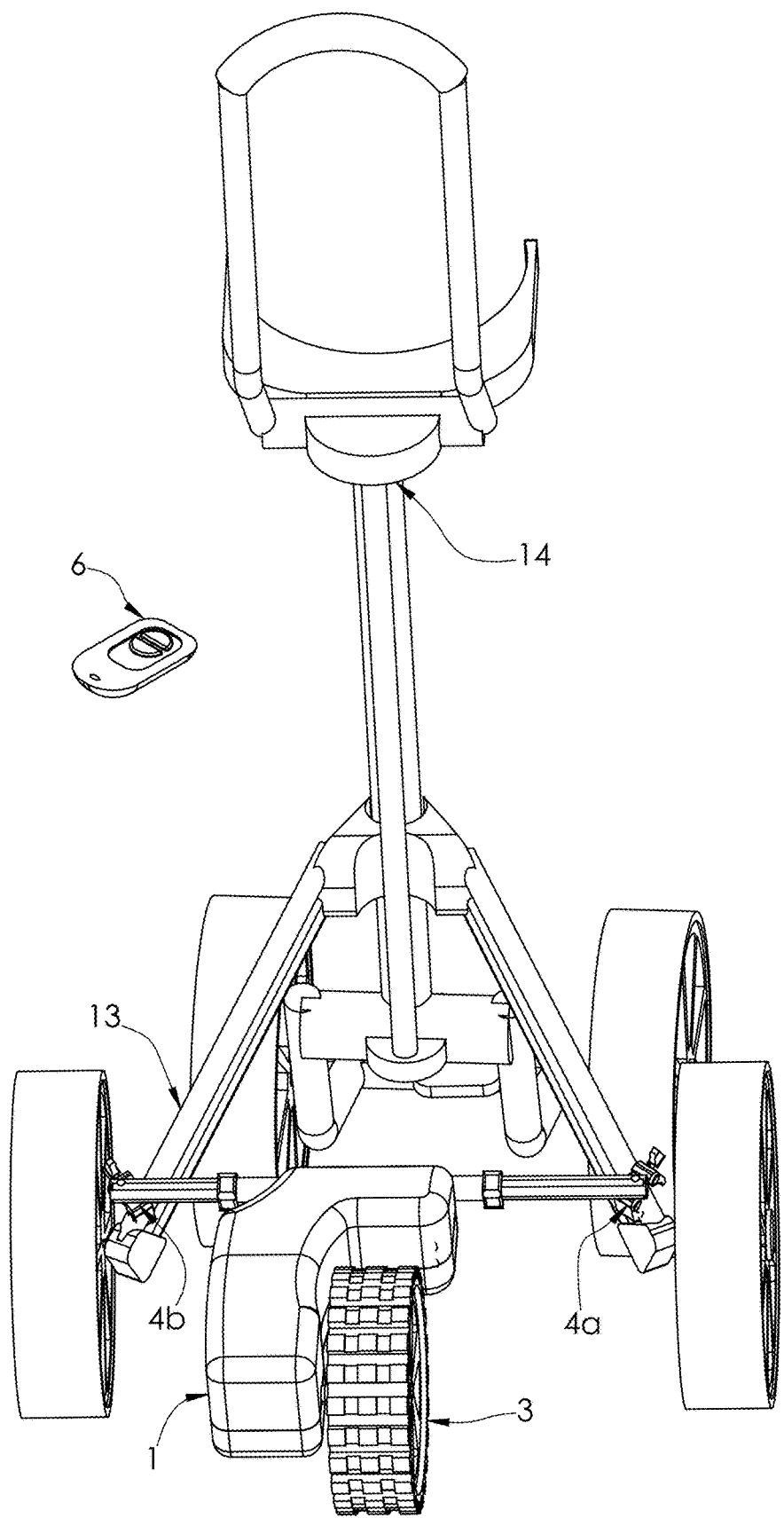
FIG. 3 illustrates a further example perspective view of the device attached to the rear axle of a golf push cart, showing the alignment and positioning.

Referring now to the drawings, FIG. 1, FIG. 2, and FIG. 3 provide different perspective views of the device (1) attached to the rear axle (13) of a golf push cart (14).

In FIG. 1, the device is shown mounted to the rear axle (13) of the golf push cart (14) with the main body (1) positioned centrally above the drive wheel (3). The main body (1) houses the essential components, including the electric motor, rechargeable batteries, and control circuit. The electric motor, which is likely a geared brushless DC motor, is positioned within the main body (1) and is connected to the drive wheel (3) through a coupler. This coupler ensures that the rotational motion generated by the motor is directly transmitted to the drive wheel (3), providing the necessary propulsion to move the cart forward. The drive wheel (3), constructed from a durable rubber compound with a high-traction tread pattern, is designed to maintain grip on various terrains commonly found on golf courses, including grass, gravel, and dirt.

The device is attached to the rear axle (13) of the cart (14) using a set of telescopic tubes (5) that extend horizontally from the main body (1). These telescopic tubes (5) are adjustable in length, allowing the device to accommodate different sizes and types of golf push carts. At the distal ends of the telescopic tubes (5), clamps (4a and 4b) are securely fastened to the frame of the cart (14). These clamps, in the present example, are aluminium alloy C-type clamps equipped with quick adjustable locking knobs that allow for easy attachment and detachment of the device, ensuring that the user can quickly install or remove the device without the need for tools or permanent modifications to the cart's structure. The clamps (4a and 4b) are designed with rubberized or silicone linings to prevent damage to the cart's frame and to ensure a secure, non-slip grip. Other suitable clamp types may also be used.

In FIG. 2, the interaction between the device and the golf push cart (14) is further detailed. The telescopic tubes (5) are shown fully extended to fit the width of the cart's rear axle (13). The flip locks (7a and 7b) near the clamps (4a and 4b) are depicted, allowing for fine-tuning of the attachment to ensure that the device is perfectly aligned with the cart's frame. This alignment is crucial for maintaining balanced propulsion, preventing the cart from veering to one side during operation.

The low-profile design of the device is evident in FIG. 3, where the device's compact nature is highlighted. The main body (1) is positioned low to the ground, which helps maintain the original center of gravity of the golf push cart (14), thereby preserving its stability and maneuverability. This design ensures that the addition of the motorized device does not adversely affect the cart's handling characteristics. The placement of the motorized wheel (3) centrally on the rear axle (13) further contributes to balanced propulsion, evenly distributing the force generated by the motor and reducing the likelihood of the cart tipping or losing traction.

The remote control (6) is shown in relation to the main body (1) in these figures, indicating that the user can operate the device wirelessly. This remote control (6) allows the user to start, stop, and control the speed of the motorized cart from a distance, providing a convenient and user-friendly interface for operating the device. The wireless communication between the remote control (6) and the control circuit within the main body (1) is likely based on RF technology, operating at a frequency such as 433 MHZ, which is typical for remote-controlled devices and offers a reliable range for use on a golf course.

Figure 4:
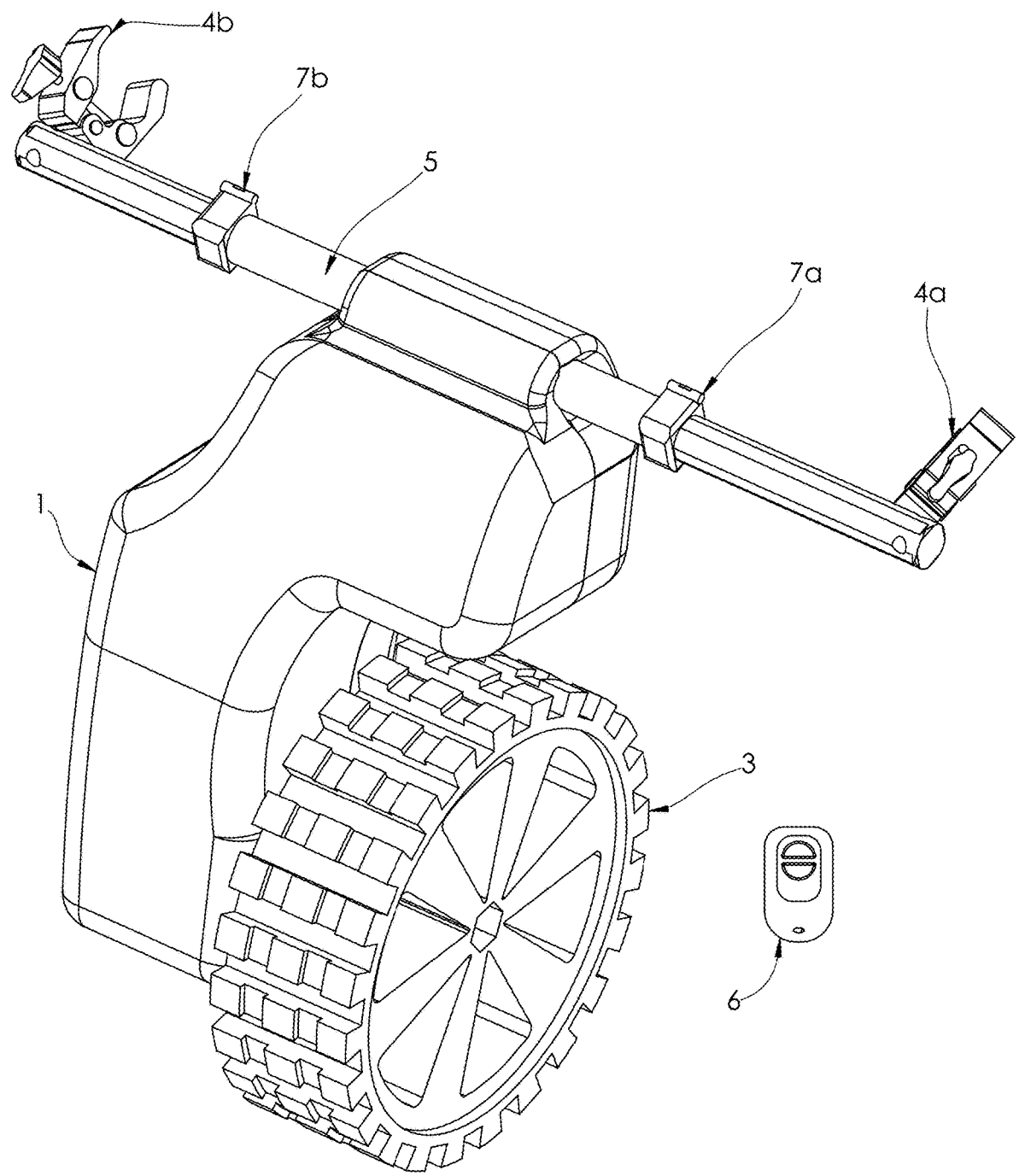
FIG. 4 illustrates an example configuration of the device on its own, highlighting the main components and attachment mechanisms.

FIG. 4 illustrates the device of the present invention on its own, providing a clear view of the various components that have been discussed in the context of their interaction with a golf push cart. This figure highlights the design and structure of the device, showcasing how it is constructed to achieve the motorization of manual golf push carts.

The main body (1) of the device is prominently displayed, encapsulating the electric motor, rechargeable batteries, and control circuit. The electric motor within the main body (1) drives the wheel (3), which is mounted directly beneath the housing. The connection between the motor and the wheel (3) is likely facilitated by a direct drive system, minimizing mechanical losses and ensuring efficient transfer of power. The wheel (3) is designed with a durable rubber compound and features a high-traction tread pattern suitable for navigating various terrains encountered on a golf course. This tread design, similar to that of all-terrain tires, includes deep grooves to provide a firm grip, preventing slippage even on wet or uneven surfaces.

Extending horizontally from the main body (1) are the telescopic tubes (5), which allow the device to adjust its width to fit different golf push carts. The telescopic tubes are likely made from a lightweight but strong material such as anodized aluminium or carbon fiber. These materials are selected for their combination of strength and low weight, ensuring that the device remains portable while still being able to withstand the stresses encountered during operation. The outer diameter of the telescopic tubes could be around 20 mm, with a wall thickness sufficient to support the load without bending or deforming. The telescopic nature of these tubes allows them to extend from a minimum length of approximately 20 cm to a maximum length of around 50 cm, providing compatibility with a range of cart sizes.

The telescopic tubes (5) feature a locking mechanism (7a and 7b) that ensures they remain securely extended once adjusted to the appropriate length. This locking mechanism could employ a flip lock system. Alternatively, it may also use a twist-lock system, similar to those used in tripods or walking sticks. By twisting the sections of the tubes in opposite directions, a friction lock is engaged, securing the tubes in place. Alternatively, detent pins may be used, automatically engaging into pre-set holes along the length of the tube, allowing the user to quickly adjust and lock the tubes at predetermined lengths. This mechanism not only ensures the stability of the attachment but also allows for quick adjustments when transitioning between different carts.

At the distal ends of the telescopic tubes (5) are the clamps (4a and 4b), which are designed to attach the device to the frame of the golf push cart. These clamps are likely constructed from aluminium alloy or reinforced nylon, materials chosen for their durability and lightweight properties. The clamps are equipped with a quick adjustable locking knob system, enabling the user to attach and detach the device without the need for tools. This system may alternatively operate using a cam action, where the lever tightens or loosens the clamp around the cart's frame with a simple flip. To prevent damage to the cart and ensure a secure fit, the inner surfaces of the clamps are likely lined with a rubberized material or silicone pads. These linings provide a non-slip grip, ensuring that the clamps hold firmly even on smooth or round tubing. Additionally, the clamps may be adjustable to fit a range of tubing diameters, from approximately 13 mm to 40 mm, accommodating different cart designs.

The flip locks (7a and 7b) near the clamps are visible in FIG. 4, indicating their role in fine-tuning the attachment. The flip lock system locks the telescopic tubes in place once they have been adjusted to the desired length. This maintains the structural integrity of the device during use, ensuring that the attachment remains secure even on uneven terrain.

Figure 5:
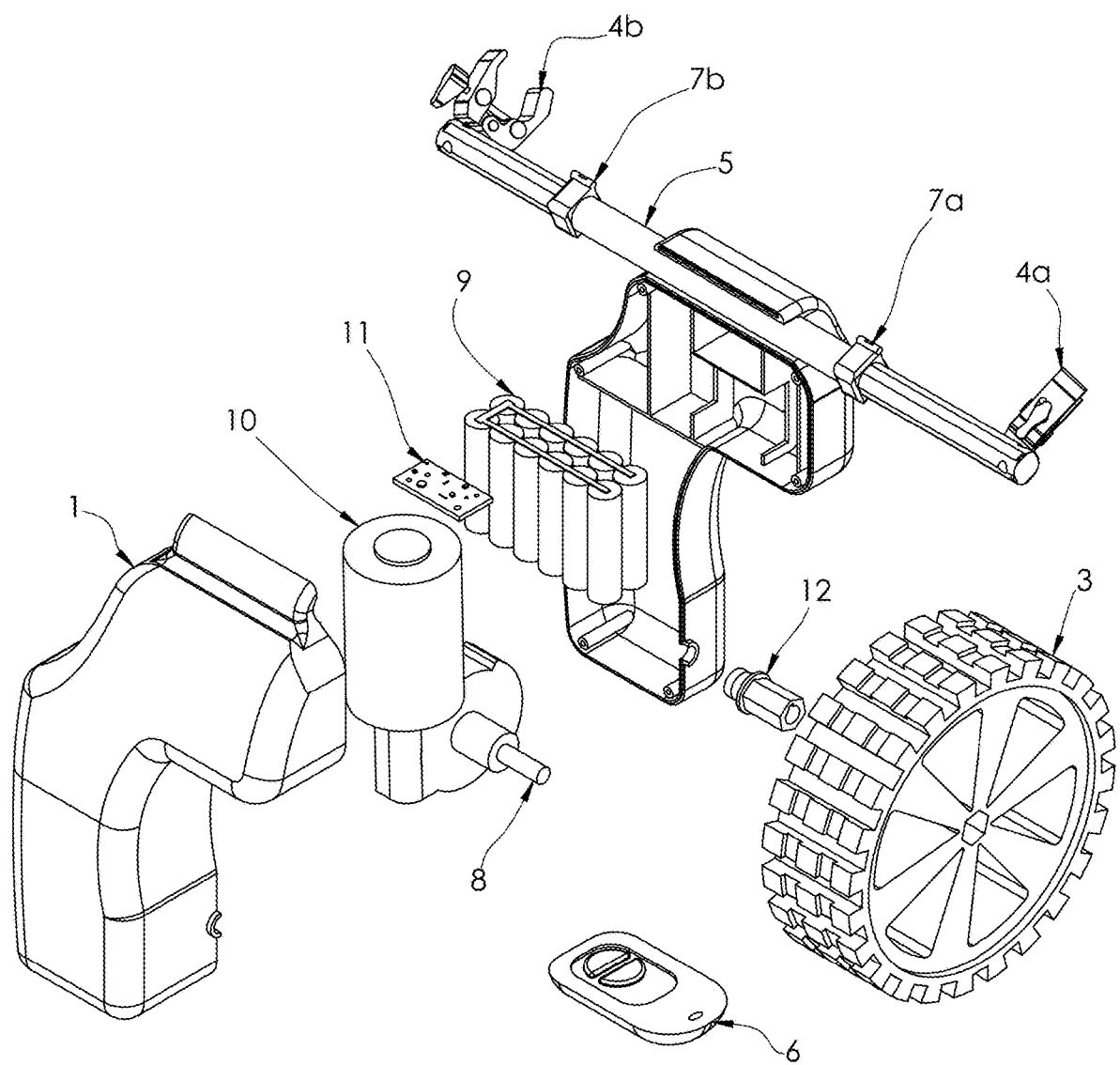
FIG. 5 illustrates an example exploded view of the device, displaying the internal components housed within the central housing alongside the remote control.

FIG. 5 presents an exploded view of the device of the present invention, revealing the internal components housed within the central housing (1) and detailing the configuration of the key elements that enable the device to motorize a manual golf push cart. The exploded view provides a comprehensive understanding of how the device is constructed, highlighting the interrelationship between its various parts and how they function together to achieve the desired operation.

The central housing (1) is shown as the primary enclosure for the device, containing several critical components that are essential for its operation. Positioned near the bottom of the housing is the motor (10), which is responsible for driving the wheel (3). The motor is likely a geared brushless DC motor (BLDC), selected for its high efficiency, reliability, and compact size. This type of motor is particularly suitable for applications where longevity and maintenance-free operation are important. The motor could have a power rating of approximately 80 to 250 watts, providing sufficient torque to propel a fully loaded golf cart over various terrains, including the inclines and uneven surfaces typically found on golf courses. The motor operates within a 24-volt system, balancing power output with battery life to ensure sustained performance during use.

The motor (10) is connected directly to the drive wheel (3) via a shaft (8) and a coupler (12). The coupler ensures that the rotational force generated by the motor is effectively transmitted to the wheel, enabling the device to propel the cart forward. The wheel (3) itself is designed with a high-traction tread pattern, made from a durable rubber compound that can handle the diverse terrains encountered on golf courses, including grass, gravel, and dirt. The deep grooves in the tread help to prevent slippage, ensuring consistent contact with the ground.

Above the motor within the central housing (1) is a cluster of cylindrical elements (9), which are likely the battery cells forming the battery pack. This lithium-ion battery pack provides the necessary power to both the motor (10) and the electronic control system housed within the device. The battery pack is chosen for its high energy density, light weight, and long cycle life. A capacity of around 10 Ah at 24V is sufficient to power the device for several hours, allowing a golfer to complete a full round without needing to recharge. The battery pack may be modular, allowing users to easily swap batteries if needed. Additionally, the battery pack includes a battery management system (BMS) to monitor charge levels, protect against overcharging, and balance the cells to extend their longevity.

The electronic control system, represented by the electrical board (11), is partially visible in this exploded view. The control system is responsible for managing the operation of the motor (10) and interfacing with the remote control (6). The control system likely includes a microcontroller that processes signals received from the remote control and adjusts the motor's performance accordingly. For example, the motor's speed and torque could be controlled through pulse-width modulation (PWM), which allows for precise adjustments to the power supplied to the motor based on user inputs or terrain conditions.

The telescopic tubes (5) and the associated clamps (4a, 4b) are also visible in FIG. 5, showing how the device can be adjusted to fit different golf push cart frames. The telescopic tubes are likely constructed from lightweight yet strong materials such as anodized aluminium or carbon fiber, providing the necessary strength to support the device while maintaining portability. The tubes can extend from approximately 20 cm to 50 cm, allowing the device to be centered on the cart for balanced propulsion. The telescopic tubes are equipped with a locking mechanism (8), which may employ a flip lock system, twist-lock system or detent pins to secure the tubes at the desired length. This ensures that the attachment remains stable during operation, even on rough terrain.

The clamps (4a, 4b) at the ends of the telescopic tubes (5) are designed to securely attach the device to the cart's frame. These clamps are likely made from aluminium alloy or reinforced nylon, materials known for their durability and light weight. The clamps may feature a quick adjustable locking knob. The inner surfaces of the clamps are likely lined with a rubberized material or silicone pads to protect the cart's frame from scratches and to provide a secure, non-slip grip. The clamps may also be adjustable to fit tubing diameters ranging from approximately 13 mm to 40 mm, accommodating a variety of cart designs.

Positioned separately from the main assembly is the remote control (6), which is used to operate the device wirelessly. The remote control is likely to communicate with the control system via radio frequency (RF) in the 433 MHz band. Using said frequency band, the remote control could have a range of 10 to 50 meters, allowing the user to operate the device from a comfortable distance. The remote interface might include buttons for starting, stopping, and adjusting the speed of the motorized cart, with LED indicators providing feedback on the device's status, such as battery level and motor engagement.

For more advanced configurations, the device could also include Bluetooth connectivity, enabling it to pair with a smartphone application. This app could offer additional controls, such as preset speed modes, GPS tracking for locating the cart, and battery monitoring. The app might also support voice control integration, providing a hands-free option for operating the device.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the motorizing device of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A device for motorizing a manual golf push cart, comprising:
    a housing containing a power unit and a control circuit, the power unit having an output element extending from the housing;
    a motive element operably connected to the output element of the power unit, the motive element being operable to engage a ground surface;
    an adjustable attachment mechanism configured to connect the housing to a frame of the manual golf push cart;
    a control interface configured to communicate with the control circuit to regulate the operation of the power unit;
    wherein the control circuit is configured to receive signals from the control interface and to control the power output from the power unit in response to the received signals;
    wherein a power source is disposed within the housing and is electrically connected to the power unit and the control circuit;
    wherein the device is attachable to and detachable from the manual golf push cart without requiring modification to the cart's frame;
    wherein the adjustable attachment mechanism includes a plurality of clamps disposed at the distal ends of the adjustable attachment mechanism, the clamps being configured to securely attach to the frame of the manual golf push cart; and
    wherein the clamps are equipped with a quick adjustable locking knob system to facilitate attachment and detachment from the frame of the manual golf push cart.

2. The device of claim 1, wherein the adjustable attachment mechanism comprises a telescopic assembly, the telescopic assembly being adjustable in length to accommodate varying widths of the golf push cart frame.

3. The device of claim 2, wherein the telescopic assembly comprises at least one telescopic tube, the telescopic tube being constructed of a lightweight material selected from the group consisting of anodized aluminium and carbon fiber.

4. The device of claim 3, wherein the telescopic assembly further comprises a locking mechanism configured to secure the telescopic tube at a desired length.

5. The device of claim 4, wherein the locking mechanism comprises one of: a twist-lock system, a flip lock system, or detent pins.

6. The device of claim 1, wherein the motive element comprises a drive wheel, the drive wheel being operable to rotate about an axis and engage a ground surface to propel the manual golf push cart.

7. The device of claim 6, wherein the drive wheel is constructed of a durable rubber compound and features a high-traction tread pattern designed for various terrains.

8. The device of claim 1, wherein the power unit comprises an electric motor, the electric motor being a geared brushless DC motor.

9. The device of claim 1, wherein the power source comprises a rechargeable battery, the rechargeable battery being a lithium-ion battery.

10. The device of claim 9, wherein the rechargeable battery has a capacity of approximately 10 ampere-hours (Ah) and is connected to a battery management system (BMS) for monitoring and protection.

11. The device of claim 9, wherein the housing includes an interface for charging the rechargeable battery, the interface being accessible from the exterior of the housing.

12. The device of claim 1, wherein the control interface comprises a remote control device configured to wirelessly communicate with the control circuit.

13. The device of claim 12, wherein the control interface further comprises a smartphone application configured to communicate with the control circuit via Bluetooth.

14. The device of claim 13, wherein the smartphone application provides additional functionalities including speed control, GPS tracking, and battery monitoring.

15. The device of claim 1, wherein the housing further includes a suspension system configured to absorb shocks and maintain contact between the motive element and the ground surface.

16. The device of claim 1, wherein the control circuit is further configured to automatically stop the power unit if communication with the control interface is lost.

17. The device of claim 1, wherein the housing is constructed from a material that is water-resistant and corrosion-resistant, providing protection against environmental factors.

18. The device of claim 1, wherein the adjustable attachment mechanism is configured to attach to the frame of the manual golf push cart without requiring permanent modifications to the cart.

* * * * *